US008317712B2

United States Patent
Burcher et al.

(10) Patent No.: US 8,317,712 B2
(45) Date of Patent: Nov. 27, 2012

(54) RETROSPECTIVE DYNAMIC TRANSMIT FOCUSING FOR SPATIAL COMPOUNDING

(75) Inventors: Michael Burcher, Tarrytown, NY (US); Jean-Luc Robert, White Plains, NY (US)

(73) Assignee: Koninklijke Philips Electronics N.V. Eindhoven (NL)

( * ) Notice: Subject to any disclaimer, the term of this patent is extended or adjusted under 35 U.S.C. 154(b) by 643 days.

(21) Appl. No.: 12/299,639

(22) PCT Filed: Apr. 17, 2007

(86) PCT No.: PCT/US2007/066758
§ 371 (c)(1),
(2), (4) Date: Nov. 5, 2008

(87) PCT Pub. No.: WO2007/133882
PCT Pub. Date: Nov. 22, 2007

(65) Prior Publication Data
US 2009/0069693 A1    Mar. 12, 2009

Related U.S. Application Data

(60) Provisional application No. 60/747,148, filed on May 12, 2006, provisional application No. 60/911,343, filed on Apr. 12, 2007.

(51) Int. Cl.
*A61B 8/14* (2006.01)
(52) U.S. Cl. ........................ 600/459; 600/443
(58) Field of Classification Search ................ 600/407, 600/437, 441, 443, 447, 455, 459, 463; 73/584, 73/587, 596, 627, 628, 629, 633, 641, 642
See application file for complete search history.

(56) References Cited

U.S. PATENT DOCUMENTS

| | | | | |
|---|---|---|---|---|
| 4,644,795 | A | | 2/1987 | Augustine |
| 5,318,033 | A | | 6/1994 | Savord |
| 5,564,424 | A | * | 10/1996 | Yao ............................. 600/455 |
| 5,647,365 | A | * | 7/1997 | Abboud ....................... 600/447 |
| 6,056,694 | A | * | 5/2000 | Watanabe et al. ............. 600/447 |
| 6,066,099 | A | * | 5/2000 | Thomenius et al. .......... 600/447 |
| 6,231,511 | B1 | | 5/2001 | Bae et al. |
| 6,482,157 | B2 | | 11/2002 | Robinson |
| 6,589,177 | B1 | | 7/2003 | Detmer et al. |
| 6,695,783 | B2 | * | 2/2004 | Henderson et al. ........... 600/443 |
| 2003/0187353 | A1 | * | 10/2003 | Ng et al. ....................... 600/437 |
| 2006/0074309 | A1 | * | 4/2006 | Bonnefous .................... 600/437 |

(Continued)

OTHER PUBLICATIONS

Frazier, C.H., et al., "Synthetic Aperture Techniques with a Virtual Source Element," IEEE Transaction on Ultrasonics, Ferroelectrics, and Frequency Control, vol. 45, No. 1, Jan. 1998, pp. 196-207.

(Continued)

*Primary Examiner* — James Kish
*Assistant Examiner* — Michael N Fisher
(74) *Attorney, Agent, or Firm* — W. Brinton Yorke, Jr.

(57) ABSTRACT

An ultrasonic diagnostic imaging system transmits a plurality of focused beams normal to the plane of a transducer aperture and receives multiple receive lines in response to each transmitted beam. Sub-apertures of the transducer aperture are defined by apodization and signals of the sub-apertures are aligned and combined to produce signals exhibiting the effect of transmit steering at different angles with respect to the sub-apertures. The steered signals are detected and the detected signals relating to common points in an image field are combined. The combined detected signals are used to produce an ultrasound image with reduced speckle.

9 Claims, 8 Drawing Sheets

U.S. PATENT DOCUMENTS

2006/0293596 A1* 12/2006 Jago et al. .................. 600/437

OTHER PUBLICATIONS

Passmann, C., et al., "A 100-MHz Ultrasound Imaging System for Dermatologic and Ophthalmologic Diagnostics," IEEE Transactions on Ultrasonics, Ferroelectrics, and Frequency Control, vol. 43, No. 4, Jul. 1996, pp. 545-552.

Bae, M.-H., et al., "A Study of Synthetic-Aperture Imaging with Virtual Source elements in B-Mode Ultrasound Imaging Systems," IEEE Transactions on Ultrasonics, Ferroelectrics, and Frequency Control, vol. 47, No. 6, Nov. 2000, pp. 1510-1518.

Philips White Paper, PR-TN 2006/00165, Koninklijke Philips Electronics, N.V., 2006, pp. vi-xlix.

* cited by examiner

RETROSPECTIVE DYNAMIC TRANSMIT FOCUSING FOR SPATIAL COMPOUNDING

This invention relates to medical diagnostic ultrasound systems and, in particular, to ultrasound systems which use retrospective dynamic transmit focusing to perform spatial compounding.

The principles of synthetic focusing, by which an ultrasound image is focused at every point in the image field, have been the subject of considerable investigation. For instance, U.S. Pat. No. 4,604,697 (Luthra et al.) describes a synthetic focus technique in which an ultrasound pulse is sequentially transmitted from each element of an ultrasonic transducer array. The echo signals received from each transmission is received by all of the elements of the array and are stored. After all of the signals have been received a focused echo signal can be formed at each point in the image field from the knowledge of the location of each transducer element relative to each point in the image and the time of flight of an ultrasound signal to and from each point. The appropriate received signals are combined to form a coherent echo signal for each point in the image. The selection of the stored data values used to form each point provides the beamformation for each point in the image. While this method will produce a focused signal at every point in the image field, it has several drawbacks. One is that the r.f. signals from the entire image field must be stored for processing. This requires a significant amount of information storage. A second drawback is that a significant amount of processing is required to select and weight the data for each point in the image, then combine the appropriately weighted data to compute the image data points. A third drawback is that this approach is effective for only a shallow penetration depth, since the energy transmitted by a single transducer element is limited.

A specific application which employs the basic principles of synthetic focusing is the traditional delay-and-sum receive beamformer, in which the delays applied to the signals from each receiving element are the equivalent of data selection in the synthetic focus technique. The traditional beamformer is a limited application of these principles as it transmits a transmit beam focused at a specific focal region and dynamically focuses echoes only along this single transmit beam. Multiple transmissions are thus required to scan the entire image field. A resulting efficiency is that data does not need to be stored for all transmissions to every point in the image; the data received from a transmission is immediately processed to form coherent echo signals along the beam direction. A limitation is that each received beam is focused on transmit to only the selected focal region. But the signal-to-noise ratio at greater depths is improved because multiple transducer elements are actuated to transmit a beam, enabling a reasonable penetration to be obtained.

U.S. Pat. No. 6,231,511 (Bae et al.) and a subsequent paper entitled "A Study of Synthetic-Aperture Imaging with Virtual Source Elements in B-Mode Ultrasound Imaging Systems" by Bae et al., IEEE Trans. UFFC, vol. 47, no. 6 (2000) at 1510 et seq. propose to combine aspects of the standard focused beamformer and synthetic focusing to improve lateral resolution outside of the conventional focal region and thus achieve the effect of transmit focusing at all points in the image field. This approach is premised upon the assumption of a "virtual source element" at the focal point of a standard transmitted beam which radiates energy both outward and inward from this "virtual source." Following transmission of a standard transmit focused beam, energy is received by the transducer elements of the receive aperture and stored. After the entire image field has been scanned, an echo signal at each point is computed from the signals received by elements of each virtual source field which encompassed the point in the field. Image points at the focal point will be imaged from only one beam, as the virtual source model is an hourglass-shaped field about the transmit focal point, but points further removed in depth from the focal point are computed from the received signals of many scanlines. The result is said to be an image which shows improved lateral resolution at points outward and inward from the transmit focal point. But like the basic synthetic aperture approach described above, a significant amount of data must be stored for processing, the r.f. signals from every element in each receive aperture. In addition the resultant image is said to appear darker around the focal point, since only one transmission and reception contributes to this image point and its resolution, whereas multiple transmissions and receptions contribute to points removed from the transmit focal point. Accordingly it is desirable to effect transmit focusing over at least a significant portion of an image but without the need to store vast amounts of r.f. data.

In a previously filed patent application by the present inventors entitled "ULTRASONIC SYNTHETIC TRANSMIT FOCUSING WITH A MULTILINE BEAMFORMER," a diagnostic ultrasound system and method are described which effect transmit focus over a significant depth of field without the need to store r.f. signal data. Multiline acquisition is used to acquire multiple receive scanlines in response to a transmit beam, and the echo data received from the insonification of points in the image field is delayed and combined to retrospectively create the effect of beams which are transmit focused throughout the image field. It is desirable to extend these principles for the reduction of speckle artifacts in the retrospectively transmit-focused image. One technique for reducing speckle is known as spatial compounding, by which the points in an image field are insonified from different look directions (apertures). The image field viewed from each look direction has a unique speckle pattern that is not correlated with the other look directions so that, when the different views of an image point are combined, the net speckle artifact is reduced. It would be desirable to perform spatial compounding on retrospectively transmit-focused images but with greater efficiency than that of conventional spatial compounding.

In accordance with the principles of the present invention, multiline acquisition is used to acquire image data from an image field. In a typical implementation this multiline data is acquired by transmitting beams normal to the plane of the transducer array. Delays are applied to the echo data received by different sub-apertures of the transducer array to create echo signals effectively steered to the same point in the image field from different look directions. The echo signals for points in the image are combined to reduce speckle. An implementation of the present invention can produce the benefit of spatial compounding without the need to transmit beams in multiple look directions, thereby increasing the frame rate of display of a spatially compounded image.

Figure 1A:
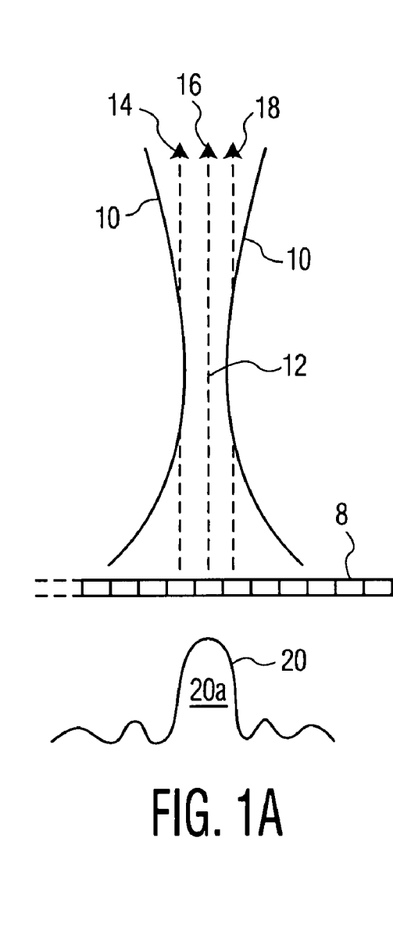
FIGS. 1a-1c illustrate beam profiles of a three-beam example of the present invention.
Figure 1B:
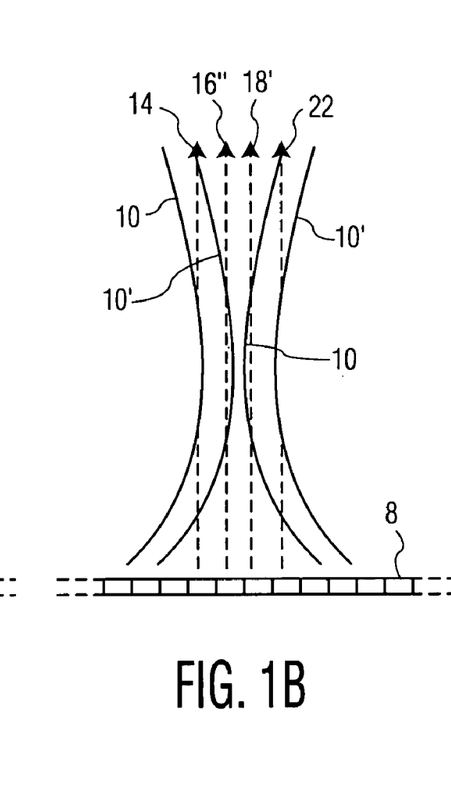
Figure 1C:
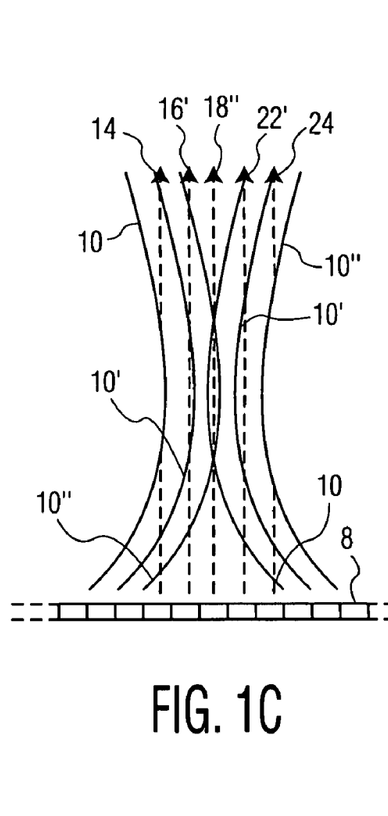

Referring first to FIGS. 1a-1c, overlapping beam profiles are shown for the transmission of three transmit beams followed in each case by the reception of three beams from each transmit beam. FIG. 1a shows the transmit beam profile 10 at a constant level below the intensity peak at the center of the beam, transmitted by and extending from a transducer array 8 that transmitted the beam. The transmit beam profile level is chosen by the designer and may be 3 dB, 6 dB, 20 dB, or some other level below the maximum intensity at the center of the beam. The beam profile is seen to be focused about a focal point 12 at the narrowest width of the beam profile by conventional transmit focusing. An orthogonal view of the beam 20 is shown below the transducer array 8 which is seen to comprise a center lobe 20a and side lobes on either side of the main lobe 20a. The transmitted beam reaches its tightest focus at the focal region 12 and diverges thereafter. In other implementations a diverging transmit beam may be used.

The transmit beam 10, 20 is transmitted with a width that encompasses multiple receive lines 14, 16, and 18. Generally a wider beam is produced by transmitting from a smaller transmit aperture. That is, a lesser number of elements of the array 8 are actuated to transmit the beam than the total number of elements across the array. Following transmission echoes are received and focused along three receive line locations 14, 16 and 18. As discussed below, the echoes received by the transducer elements of the receive aperture are delayed and summed in three different ways to form multiple lines at different line locations 14, 16, and 18 in response to one transmit beam. In this example receive line 14 is received down the center of the transmit beam 10, 20 and receive lines 14 and 18 are laterally steered and focused to be received on either side of the center line. In this example only the near field and far field portions of the outer lines 14 and 18 are within the transmit beam profile 10. In these regions the outer lines 14 and 18 are received from transmit energy on either side of the center line position thereby sampling targets in the image field on both sides of the center line position, thereby efficiently using the laterally spread energy of the transmit beam in the near and far fields for image reception and resolution.

In FIG. 1b a second beam has been transmitted by shifting the transmit aperture to the right by the spacing of one receive line. The second transmit beam has the same beam profile as the first transmit beam and is outlined by beam profile curves 10'. As in the case of the first beam, three receive lines are simultaneously received and beamformed in response to the second transmission at receive line locations 16', 18' and 22. As a result, receive line 16' is aligned with receive line 16 from the first transmission, receive line 18' is aligned with receive line 18 from the first transmission and receive line 22 is located to the right of the center line 18' of the second transmission. Like the first set of receive lines, the second set of receive multilines 16', 18', and 22 is saved for subsequent processing.

In FIG. 1c a third beam has been transmitted from a center aperture location which is again shifted to the right by one receive line. This transmit beam is outlined by beam profile 10" and the transmission is followed by the simultaneous reception of three receive lines 18", 22' and 24. These three receive lines, like the previous receive lines, are wholly or partially within the beam profile of their transmit beam with the same spacing as the lines of the preceding beams. As a result, receive line 18" is axially aligned with receive line 18' of the second transmission and receive line 18 of the first transmission, and receive line 22' is axially aligned with receive line 22 of the second transmission. The targets in the path of receive lines 18, 18' and 18" have now been sampled by three receive lines, each by a respectively different transmit beam. These co-aligned beams are combined as described below to produce a line of image data along the line which are focused over a greater depth of field than is the case of any individual line, creating an extended transmit focus effect. The focusing will be effective over a greater depth of field as the echo energy from three beam transmissions is combined to produce the resultant image data.

In this example of retrospective transmit focusing, transmission and reception continues across the image field in this manner until the full image field has been scanned. Each time the maximum number of receive lines for a given line location has been acquired, three in this example, the receive lines are processed together to produce a retrospectively transmit focused line of image data at that location. There is thus no need to store pre-summed r.f. data from any transmission as the received r.f. signals are beamformed into multiple lines as they are received, and there is only a limited need to store previous lines at a line location until all of the receive lines at the location have been acquired, at which time they can be processed and the line storage freed up for storage of subsequent lines.

Higher numbers of simultaneously received lines may be used, such as eight, twelve or sixteen spaced apart, simultaneously received lines, for which a lower F number on transmit should be used to insonify the greater expanse of receive line locations. Other examples of retrospective dynamic transmit focusing are described in our aforementioned previously filed patent application Ser. No. 60/747,148, the contents of which are incorporated herein.

Figure 2A:
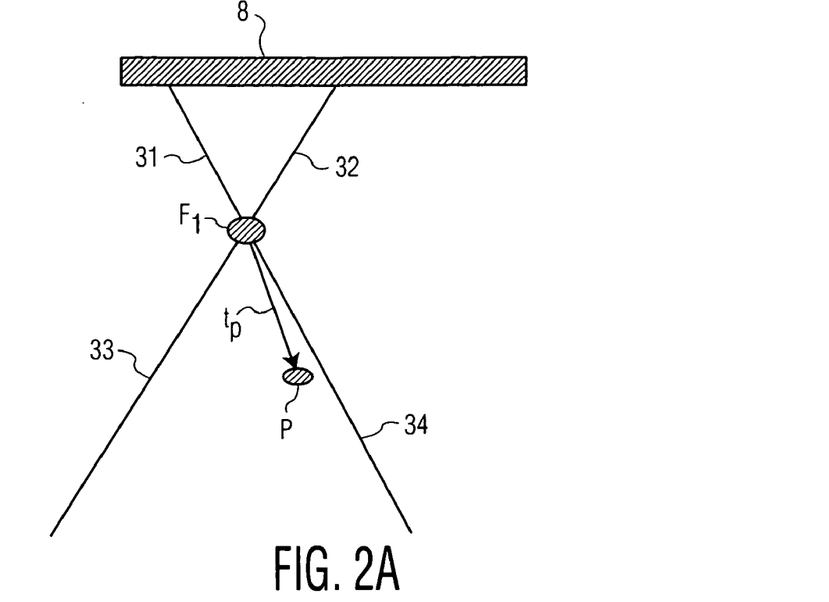
FIGS. 2A-2D illustrate the development of a signal for a point in an image from the perspective of virtual transducers.

The effect of retrospective dynamic transmit focusing can be analyzed using the virtual transducer approximation proposed by Passman and Ermert in 1996. See C. Passmann & H. Ermert, "A 100-MHz ultrasound imaging system for dermatologic an opthalmologic diagnostics," *IEEE Trans. Ultrasonics, Ferroelectrics and Frequency Control*, vol. 43, no. 4, pp. 545-52 (1996). This proposal considers that the focal point of a transmit beam can be considered as a virtual transducer which insonifies each point in the image field within the beam profile. An example of this proposal is shown in FIG. 2A, which shows a transducer array 8 transmitting a beam which is focused at focal point $F_1$. The beam profile for the transmit beam which converges on this focal point and diverges thereafter is defined by lines 31-34. A transmit beam will take a known amount of time at the speed of sound to converge at the focal point $F_1$. Thereafter, as the wavefront of the beam spherically diverges, an amount of time $t_p$ is required for the wavefront to insonify a point P in the image field. With the speed of sound in the medium being known, the time $t_p$ and the total transmit time can be calculated.

Figure 2B:
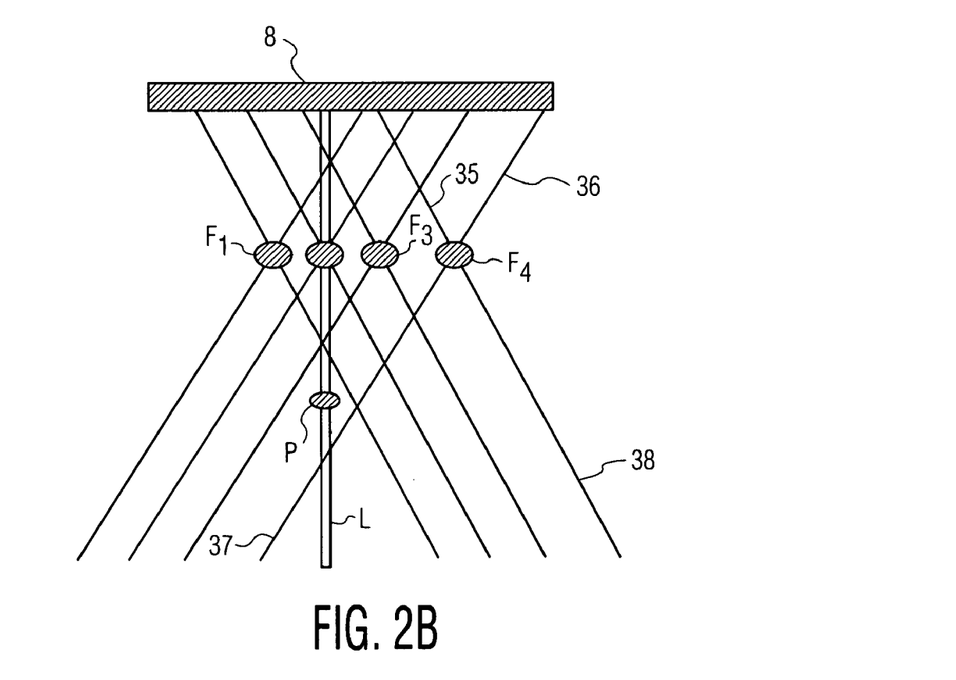
Figure 2C:
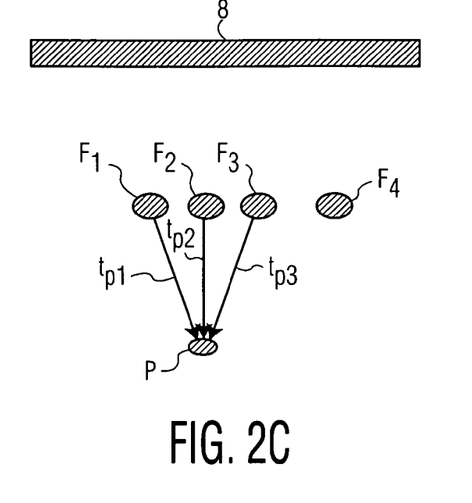
Figure 2D:
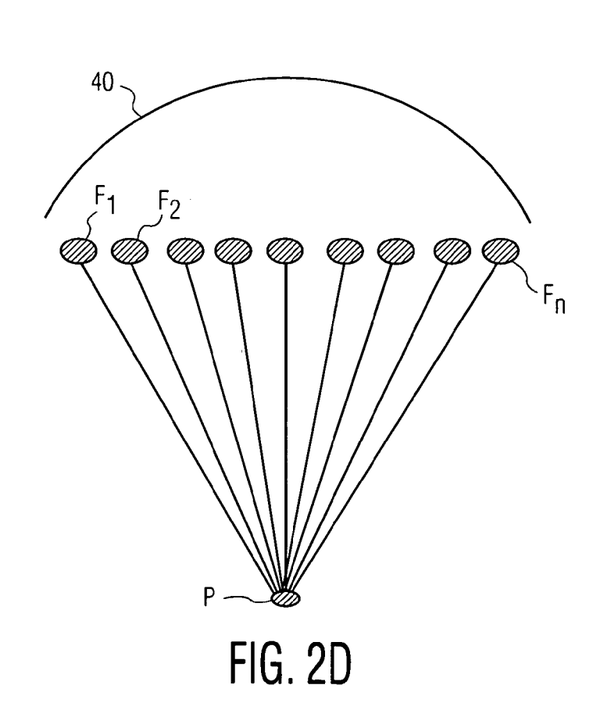

In FIG. 2B a number of transmit beams have been transmitted from the transducer array 8 which have focal points shown as $F_1$-$F_4$. The beam profiles for these transmit beams are also delineated in FIG. 2B. It is seen in this example that the point P is insonified (in the beam profiles) by the beams focused at focal points $F_1$-$F_3$, but is not insonified by the fourth beam focused at focal point $F_4$, as the point P is outside of the beam profile 35-38 of this fourth beam. Thus, the contributions of the echoes from the first three transmit beams which insonify point P can be coherently combined to produce an effective focused signal at point P as shown in FIG. 2c. Using the virtual transducer analysis, the times required for a wavefront to travel from each virtual transducer focal point $F_1$, $F_2$, and $F_3$ to insonify point P can be calculated, then equalized with delays so that the echoes are coherently constructively combined to form the effective signal focused at and returned from point P. As FIG. 2B illustrates, such echoes from transmit focusing can be found along an entire receive line L. The delay profile 40 needed to focus signals from a full aperture $F_1$-$F_n$ at point P is illustrated in FIG. 2D. As would be expected for a point in the center of the aperture as in this example, the delay is greatest in the center of the aperture where the transit time to point P is the shortest, and is the least at the sides of the aperture where the transit time to point P is the longest. In a constructed implementation the center focal point was assumed to need no delay, which means that the delays for the focal points lateral to the center are negative delays taken from earlier points in time of the received signals.

Figure 3A:
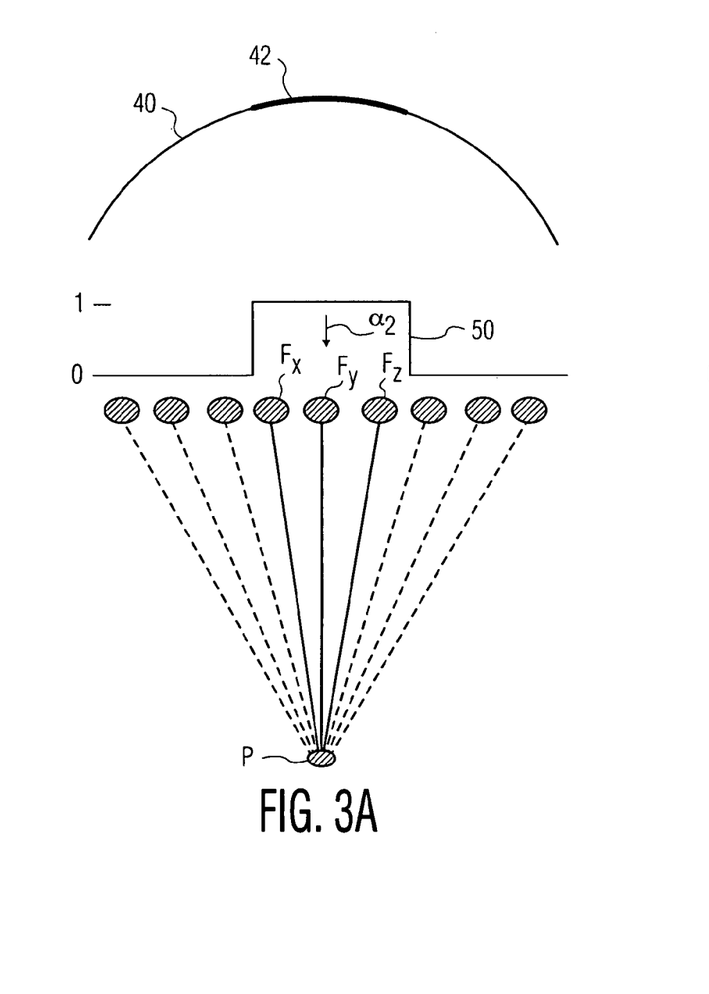
FIGS. 3A and 3B illustrate the steering of a beam for a point in an image through retrospective apodization and delay steering in accordance with the principles of the present invention.

In accordance with the principles of the present invention, this retrospective transmit focusing technique is used to create echo signals from a point in the image field as if it were insonified from different look directions. Different apertures are used for the different look directions which give the created signals speckle components which are relatively decorrelated for the different look directions such that, when the echo signals are combined, the overall image speckle is reduced. Referring to FIG. 3A, which is similar to FIG. 2D, an aperture for a given look direction is selected by apodization. In this example the apodization function 50 is a square wave having a value of one around the central elements of the transducer array and zero at other locations of the array. It will be appreciated that other apodization weights can be used such as those of a smoothly varying or other function. The central apodization function 50 causes the signals of the sub-aperture of the (virtual) transducer element focal points $F_x$, $F_y$, and $F_z$ to be used to form a signal at point P. These signals are delayed by the highlighted portion 42 of the delay profile 40, producing a signal for point P as if the point P were insonified by a transmit beam transmitted normal to the plane of the transducer elements, a transmit beam angle $\alpha_2$ indicated by the arrow in FIG. 3A.

Figure 3B:
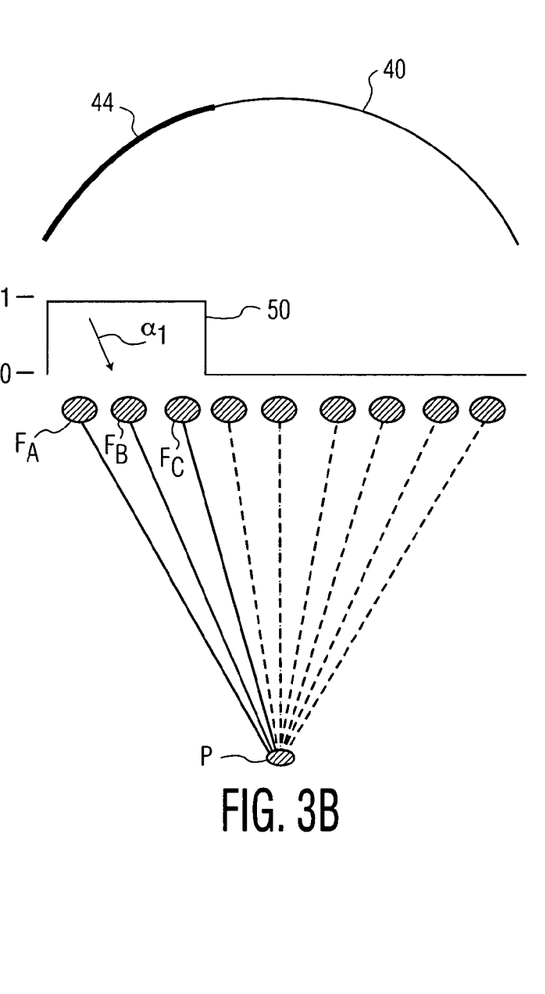

FIG. 3B is similar to FIG. 3A except that the apodization function 50 has moved to the left side of the transducer aperture to select a sub-aperture at the left for formation of an echo signal at point P. When this sub-aperture is chosen a signal is produced as if the point P were being interrogated from a look direction at the left side of the array. The signals of the (virtual) transducer elements $F_A$, $F_B$, and $F_C$ at the left side of the array are selected by the weighting function 50 and delayed by delays indicated by the highlighted portion 44 of the delay profile 40. The combined signals produce an echo equivalent to insonifying point P from a look direction steered from left to right at an angle $\alpha_1$ as indicated by the arrow in the drawing. The beam steering caused by the different delays for the different sub-apertures results in signals for point P with decorrelated speckle characteristics in the two samples. When the combined signals of each sub-aperture are detected and then combined the speckle artifact at point P is reduced.

It will be appreciated that the retrospective beam steering described above can be used for other purposes such as the production of a steered linear image.

A typical operating sequence is as follows. A series of laterally displaced beams are transmitted from a transducer array. Generally these beams will be transmitted normal to the plane of the array (direction $\alpha_2$). For each transmitted beam a multiline beamformer receives multiple beams at different lateral locations. In some implementations different steering angles can be used for the received beams. The received signals are delayed and combined to form received multilines which are focused over a considerable depth of field by retrospective transmit focusing as described in our previously filed patent application. The retrospective transmit focusing delays may be separate delays or may be included in the multiline beamformer delays. Groups of the received signals are weighted and coherently combined, which effects a retrospective apodization and steering of the transmit beam. Each group of signals is for a different sub-aperture for a particular look direction. The combined signals are detected, generally with log compression for the desired contrast resolution, and detected signals from different look directions for a common point are combined to form image points for a displayed image.

Figure 4A:
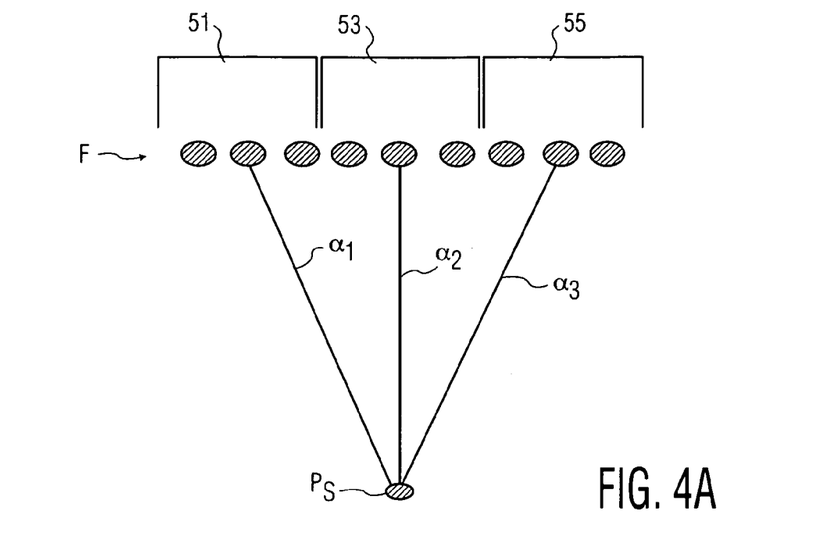
FIGS. 4A-4D illustrate the steering of different beam angles from differently configured sub-apertures.

The use of different apertures can produce different beam steering directions (different look directions) as illustrated in FIGS. 4A-4D. In FIG. 4A three different steering directions, $\alpha_1$, $\alpha_2$, and $\alpha_3$, are used to insonify a point at a shallow depth $P_S$ from the array of virtual transducers (focus depth) in the image field. Each beam emanates from a different sub-aperture of the array of virtual transducers as chosen by a different apodization function 51, 53, and 55.

Figure 4B:
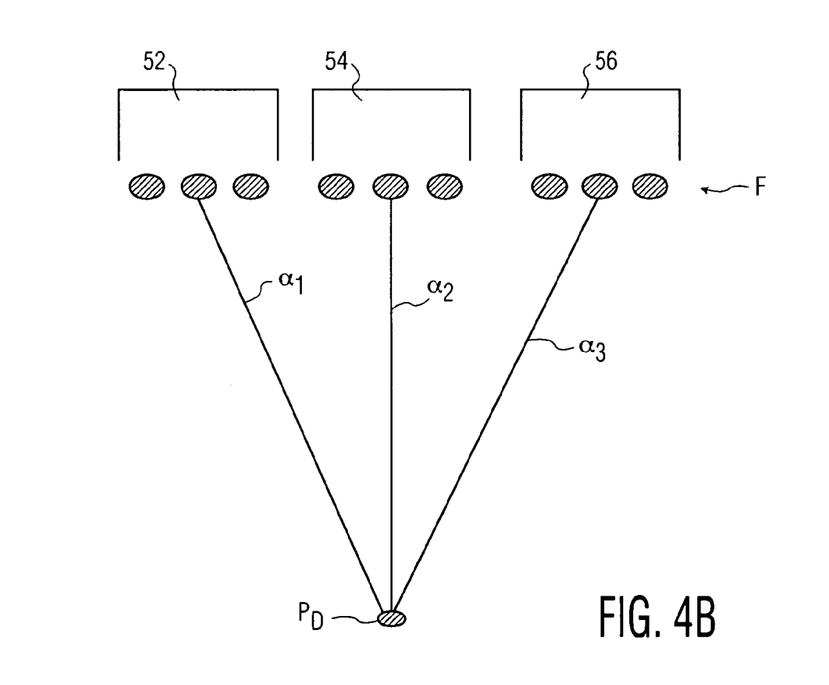

In FIG. 4B the same three steering directions are used for a point $P_D$ at a deeper depth of the image field. In order to maintain the steered beams at the same angles $\alpha_1$, $\alpha_2$, and $\alpha_3$, different sub-apertures must be used as indicated by the apodization functions 52, 54, and 56 which choose the different sub-apertures. These sub-apertures must use virtual transducer elements at different locations and/or distributions in order to maintain the same set of look directions at the different depths. One skilled in the art will recognize that the sub-apertures will expand dynamically with depth as is customary in ultrasound array systems.

Figure 4C:
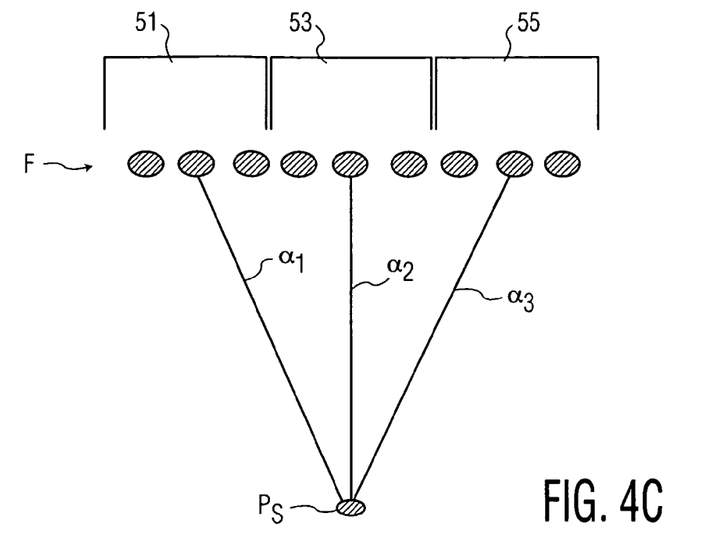
Figure 4D:
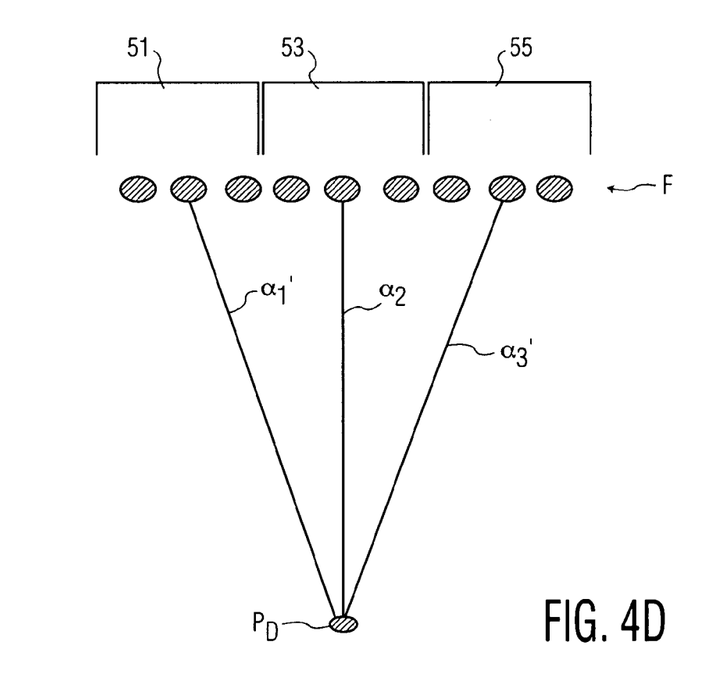

In FIGS. 4C and 4D the same apertures are used at both the shallow depth of point $P_S$ and the deeper depth of point $P_D$. While the orthogonal angle is readily produced ($\alpha_2$), the geometry of the same apertures 51, 53, 55 at the deeper depth results in the other two angles $\alpha_1'$ and $\alpha_3'$ being less steep. The effect on speckle reduction by the use of these slightly different look directions at different depths will not be noticeable in most implementations. An embodiment of FIGS. 4C-4D is beneficial near the edge of an image where the number of multilines available for retrospective focusing is limited.

Figure 5:
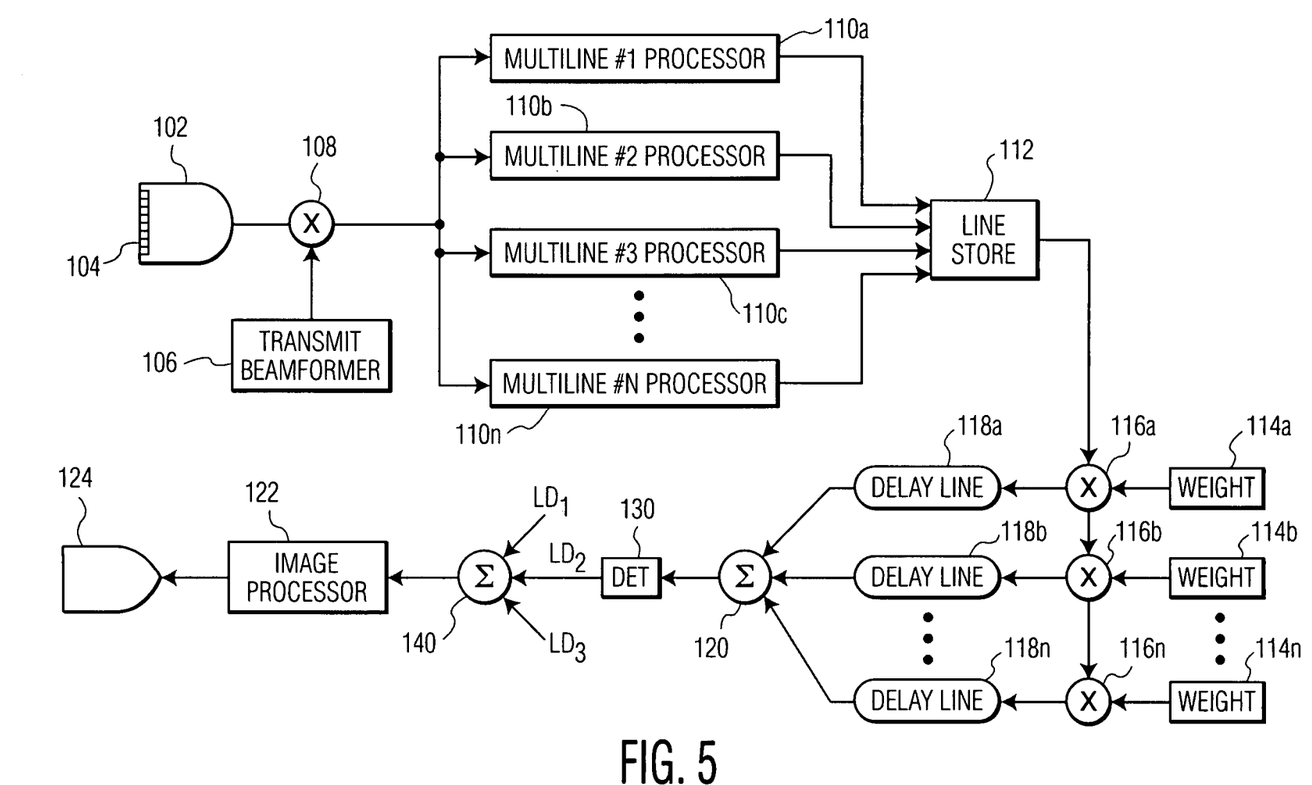
FIG. 5 illustrates in block diagram form an ultrasound system constructed in accordance with the principles of the present invention.

FIG. 5 illustrates in block diagram form an ultrasonic imaging system constructed in accordance with the principles of the present invention. An ultrasonic probe 102 includes a transducer array 104 of transducer elements. Selected groups of the transducer elements are actuated at respectively delayed times by the transmit beamformer 106 to transmit beams focused at selected focal regions in the desired directions and from the desired origin(s) along the array. The transmit beamformer is coupled to the transducer elements by a transmit/receive switch which may comprise a crosspoint switch that protects the receiver inputs from the high voltage transmit pulses applied. The echoes received by each transducer element of the array 104 in response to each transmit beam are applied to the inputs of multiline processors 110a-110n. Each multiline processor comprises a receive beamformer which applies its own set of delays and, if desired, apodization weights to weight the received echoes from the array elements to form a differently steered receive beam from the same transmit beam. Suitable multiline beamformers for the multiline processors 110a-110n may be found, for instance, in U.S. Pat. No. 6,695,783 (Henderson et al.) and U.S. Pat. No. 5,318,033 (Savord). The outputs of the multiline processors 110a-110n are coupled to a line store 112 which stores the received multilines at least until all of the multilines needed to form a line of display data have been acquired. The group of multilines used to form a particular line of display data are applied to respective ones of multipliers 116a-116n to produce the display data for the corresponding line location. The echo data from each line may, if desired be weighted by apodization weights 114a-114n. In general, these weights will weight each line as a function of its transmit impulse response.

In a previously filed patent application, the following weighting and delaying algorithm was presented. A suitable weighting algorithm can be derived by letting the term amplitude(x,z) be the insonification amplitude of a point at location (x,z) in the image field by the transmit wave-front, the azimuth position x=0 corresponding to the center axis of the transmit beam. Let X be the azimuth of the received multiline with respect to the transmit beam axis. The weight applied to this received multiline to form a point of the image at depth Z is:

Weight(X,Z)=amplitude(X,Z)

For determination of an appropriate delay characteristic, let propagation_time(x,z) be the propagation time needed by the transmit wavefront to reach a point at location (x,z), the azimuth x=0 corresponding again to the center axis of the transmit beam. Let X be the azimuth of the receive line with respect to the transmit beam axis. The delay applied to this received multiline to form a point of the image at depth Z is:

Delay(X,Z)=propagation_time(X,Z)−propagation_time(0,Z)

where propagation_time(0,Z) is the time to reach a point at the same depth but on-axis.

The functions amplitude(X,Z) and propagation_time(X,Z) may, for example, be obtained from a simulation of the transmit field. An appropriate way to compute the propagation time is to use the phase delay of the field from monochromatic simulation at several frequencies. The amplitude may be computed by averaging the amplitude of the field at several frequencies. In addition, a depth-dependent normalization can be applied to the weights. This multiplies all the weights at a given depth by a common factor. For example, the normalization can be chosen so that speckle regions have uniform brightness with depth. By varying the weights as a function of depth, it is possible to vary the size and shape (apodization) of the aperture dynamically with depth.

In the present invention, if the propagation time and amplitude of the full transmit aperture are used for the delays and weights, a dynamic focusing is obtained, but no steering is achieved. To achieve the steering, a first possibility is to use the propagation time and amplitude of the full transmit together with a sub-aperture selector, so that the delays and weights are applied only to the virtual transducers that are used for a given steering direction, as shown in FIG. 3. The effect of the sub-aperture selector is to apply a weight equal to zero to the virtual transducers that are not contributing to the beam. Ideally, the sub-aperture is varying with the depth.

Another possibility is to simulate the field generated by a sub-aperture of the physical array. For example, assume that the signals for three steering directions have to be generated. Then, the full transmit aperture can be divided into three sub-apertures, and the field can be simulated for each of the three sub-apertures. The amplitude and the propagation time of the wave-fronts is used for the delays and weights of the corresponding steering directions. In this case, the sub-aperture selector is no longer necessary, as its function is carried out by the weights.

The amplitude and propagation time do not need to be derived from a simulation of the exact transmit characteristics used in the system. The designer may choose to use a different aperture size or a different apodization for example.

The echoes from each line are weighted by the multipliers 116a-116n and delayed by delay lines 118a-118n. In general, these delays will be related to the location of the transmit beam center to the receive line location as shown above. The delays are used to equalize the phase shift variance that exists from line to line for the multilines with differing transmit-receive beam location combinations, so that signal cancellation will not be caused by phase differences of the combined signals.

It will be appreciated that in a digital system the delay lines may be effected by storing the weighted multiline echo data in memory and reading the data out at later times which effect the necessary delay. Shift registers of differing lengths and clock signals may also be used to effect a digital delay, or an interpolating beamformer such as that described in the aforementioned U.S. Pat. No. 6,695,783 may be used. The delayed signals are combined by a summer 120 and the resultant signals are coupled to an image processor 122. The image processor may perform scan conversion or other processing to improve the displayed image. The resultant image is displayed on an image display 124.

In the system of FIG. 5 the delay lines 118 and summer 120 effect a refocusing of the signals received from the several receive multilines which are co-aligned in a given direction. The refocusing adjusts for the phase differences resulting from the use of different transmit beam locations for each multiline, preventing undesired phase cancellation in the combined signals. The weights 114 weight the contributions of the multilines in relation to the proximity of the transmit beam to the multiline location, giving higher weight to receive beams with higher signal-to-noise ratios. This results in an extended depth of field along each receive line and an enhanced penetration (improved signal-to-noise ratio) due to the combination of multiple samplings in each receive line direction.

This processing, which interpolates multiple received signals, will effect a transmit refocusing of the echo signals for a beam steered normal to the plane of the transducer array 104 as described in our pending patent application. In an implementation of the present invention both a steering direction and focusing in the selected direction are provided by the delay lines 118. For an implementation of the present invention which performs spatial compounding the sub-aperture for the steered beam must also be chosen as described in conjunction with FIG. 4. In the implementation of FIG. 5 the sub-aperture is chosen by the apodizing weights 114 which accentuate the signals of the desired sub-aperture while attenuating or omitting signals from other regions of the array. Thus the weights 114 in FIG. 5 select the sub-aperture of the steered beam and the delay lines 118 impart the necessary steering and focusing delay. The delayed signals are then combined by the summer 120 to form the retrospectively steered transmit beam. The coherent echo signals for the steered beam are then detected by a detector 130 to form the beam for look direction 1 ($LD_2$).

The same sub-aperture selection processing and steering is performed for the other look directions, $LD_1$ and $LD_3$ in this example. When signals for all of the desired look directions have been processed and detected for a particular point in the image, three in this example, the signals are combined by a summer 140 to form the speckle-reduced signal. The image data is processed by an image processor 122 which performs functions such as scan conversion to the desired image format, and the image is displayed on a display 124. The function of FIG. 5 may be performed in other sequences if desired in a particular implementation. For instance, the detected signals of each look direction may be scan converted, then the scan converted signal data combined by the summer 140.

Figure 6A:
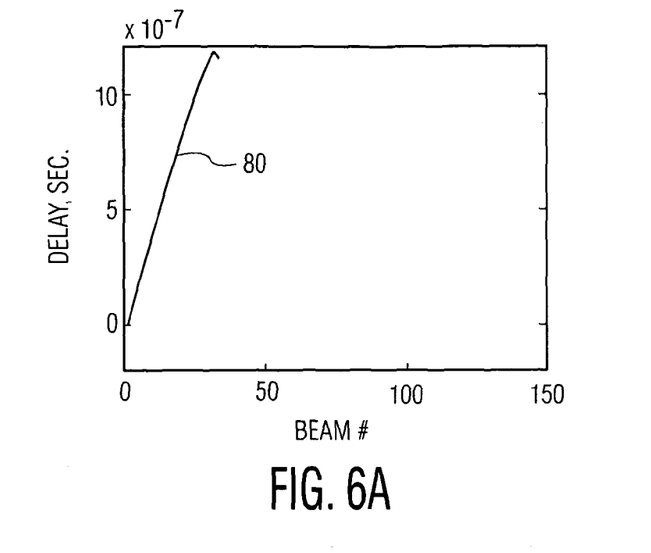
FIGS. 6a and 6b illustrate delay profiles for multilines which have been steered and unsteered on receive.
Figure 6B:
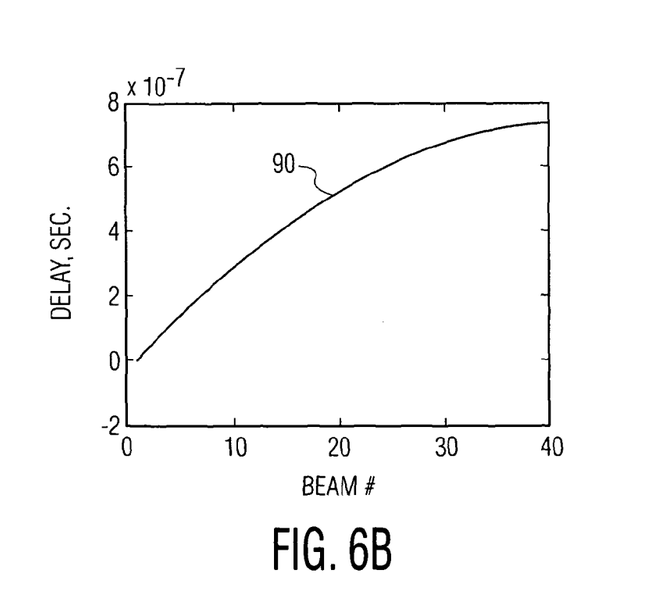

In order to provide speckle reduction through spatial compounding, the different look directions can be employed on transmit, on receive, or both. The foregoing processing effects different transmit look directions through retrospective steering of beams originally transmitted normal to the plane of the transducer array. Receive look direction diversity may be implemented in several ways. One is to actually steer the beams on receive by choosing the appropriate delay profile and apodization employed by the multiline processors. The initial transmit beams are transmitted normal to the plane of the array and on receive the receive beams are steered in different directions as is known in the art. Alternatively, receive steering may be applied retrospectively. After the transmit beams are transmitted normal to the array the multilines are received in the same direction. For a given transmit, retrospectively steered receive beams can be formed by appropriately delaying and weighting the different multiline receive beams. The retrospective transmit interpolation can then be carried out as previously described. Alternatively, the receive and transmit interpolation can be carried out in a single stage, whereby receive multilines from several transmit events and several receive locations are delayed, weighted and combined to form a given round-trip line. FIG. 6A illustrates an exemplary delay profile applied to multilines which are received normal to the array. The profile curve 80 is defined for the first few transmits only, indicating that it is for the leftmost sub-aperture of the array of virtual transducers. FIG. 6B illustrates a delay profile 90 for multilines which have been steered on receive. The slope of the delay curve 90 indicates the substantially linear steering term of these delays.

Variations of the present invention will occur to those skilled in the art. For instance, the transmitted beams do not have to be transmitted normal to the plane of the array but may be transmitted at an acute angle such as one of the other steering angles. The different sub-apertures do not have to be entirely distinct In other implementations a small number of received multilines can be increased by interpolating additional intermediate multilines, then performing the inventive processing with the increased number of multilines. The sub-aperture selection and beam steering delay can be implemented separately or composited with the apodization and delays of the multiline processors. The steered beams can be put to other uses, such as steering at only the lateral sides of a 2D image to form a trapezoidal image format. An implementation of the present invention can provide superior motion artifact immunity compared to standard spatial compounding, as only a single scan of the image field is needed to form the different steering directions. The time of the scan to produce the data needed for an image, and consequently motion artifacts, are reduced.

What is claimed is:

1. A method for producing ultrasound images with reduced speckle artifact comprising:
   transmitting focused beams in a given direction from an array transducer over an image field;
   receiving a plurality of multilines of echo signals in response to each transmitted beam at different sub-apertures of the array transducer;
   processing the multiline echo signals received by the different sub-apertures in response to each of the transmitted beams to produce signals of differently steered beams for each sub-aperture exhibiting an effect of transmit beams focused in a plurality of different look directions for each of a plurality of points over the image field;
   detecting the steered beam signals; and
   combining detected steered beam signals which correspond to a common point in the image field.

2. The method of claim 1, further comprising displaying an image of the combined detected steered beam signals.

3. The method of claim 2, further comprising processing the multiline echo signals to produce signals of beams exhibiting an effect of beams focused in a plurality of directions on transmission and reception.

4. The method of claim 1, wherein processing further comprises defining different sub-apertures for the steered beams.

5. The method of claim 4, wherein defining different apertures further comprises apodizing received multiline echo signals.

6. The method of claim 5, wherein producing signals of steered beams further comprises aligning and combining received multiline echo signals.

7. The method of claim 1, wherein the given direction further comprises the direction which is normal to a plane of a transducer array,
   wherein one of the plurality of directions is the given direction.

8. The method of claim 7, wherein receiving a plurality of multilines of echo signals further comprises receiving a plurality of multilines of echo signals in the given direction.

9. The method of claim 7, wherein receiving a plurality of multilines of echo signals further comprises receiving a plurality of multilines of echo signals steered in the plurality of directions.

* * * * *